United States Patent
Ozawa et al.

(10) Patent No.: US 11,377,145 B2
(45) Date of Patent: Jul. 5, 2022

(54) VEHICLE CONTROL DEVICE AND CONTROL METHOD FOR VEHICLE

(71) Applicant: TOYOTA JIDOSHA KABUSHIKI KAISHA, Toyota (JP)

(72) Inventors: Jun Ozawa, Machida (JP); Minami Sato, Ebina (JP); Shinichi Nagata, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/236,701

(22) Filed: Dec. 31, 2018

(65) Prior Publication Data

US 2019/0217883 A1  Jul. 18, 2019

(30) Foreign Application Priority Data

Jan. 17, 2018 (JP) .............................. JP2018-005924

(51) Int. Cl.
*B62D 6/00* (2006.01)
*B62D 15/02* (2006.01)

(52) U.S. Cl.
CPC ............. *B62D 6/001* (2013.01); *B62D 6/002* (2013.01); *B62D 15/025* (2013.01)

(58) Field of Classification Search
CPC ....... B62D 6/001; B62D 6/002; B62D 15/025
See application file for complete search history.

(56) References Cited

U.S. PATENT DOCUMENTS

| 2009/0157247 | A1* | 6/2009 | Sjogren | B62D 1/28 701/23 |
| 2010/0318263 | A1* | 12/2010 | Hayakawa | B60T 8/17557 701/41 |
| 2011/0144859 | A1 | 6/2011 | Suk et al. | |
| 2014/0297094 | A1* | 10/2014 | Dolgov | B60W 30/18163 701/28 |
| 2015/0224987 | A1 | 8/2015 | Tachibana | |
| 2016/0339914 | A1* | 11/2016 | Habu | B60W 30/12 |
| 2017/0010106 | A1* | 1/2017 | Shashua | G01C 21/3407 |

(Continued)

FOREIGN PATENT DOCUMENTS

| CN | 106573618 A | 4/2017 |
| JP | 2001-048036 A | 2/2001 |

(Continued)

*Primary Examiner* — Hunter B Lonsberry
*Assistant Examiner* — Elizabeth Yang
(74) *Attorney, Agent, or Firm* — Sughrue Mion, PLLC

(57) ABSTRACT

A vehicle control device includes an external sensor configured to acquire environmental information around a host vehicle, and an electronic control unit. The electronic control unit is configured to control the host vehicle so that the host vehicle travels along a target travel trajectory; detect an adjacent preceding vehicle that is traveling in a lane adjacent to a lane in which the host vehicle is traveling; acquire environmental information on a road side or a lane on an opposite side of the lane in which the adjacent traveling vehicle is traveling from the lane in which the host vehicle is traveling; and generate the target travel trajectory of the host vehicle so as to move away from the adjacent preceding vehicle in a width direction of the lane in which the host vehicle is traveling, within a lane width of the lane in which the host vehicle is traveling.

7 Claims, 8 Drawing Sheets

(56) References Cited

U.S. PATENT DOCUMENTS

| | | | | |
|---|---|---|---|---|
| 2017/0153644 A1* | 6/2017 | Otsuka | ................. | B60W 50/14 |
| 2017/0236422 A1* | 8/2017 | Naka | .................... | B60W 30/12 |
| | | | | 701/301 |
| 2017/0291603 A1 | 10/2017 | Nakamura | | |
| 2017/0316684 A1* | 11/2017 | Jammoussi | ...... | G08G 1/096775 |
| 2017/0371337 A1* | 12/2017 | Ramasamy | ............ | G01C 21/32 |
| 2018/0086338 A1* | 3/2018 | Yamada | ................ | B60W 50/14 |
| 2019/0294167 A1* | 9/2019 | Kutila | .................... | G06Q 10/04 |
| 2020/0172108 A1* | 6/2020 | Ziegler | ................. | G08G 1/165 |

FOREIGN PATENT DOCUMENTS

| | | | | |
|---|---|---|---|---|
| JP | 2006-205860 A | 8/2006 | | |
| JP | 2007-148964 A | 6/2007 | | |
| JP | 2014-80046 A | 5/2014 | | |
| JP | 2017-106806 A | 6/2017 | | |
| JP | 2019061703 A * | 4/2019 | ............ | B60W 30/09 |
| WO | 2016/024315 A1 | 2/2016 | | |

\* cited by examiner

FIG. 4

| SITUATION TYPE | REFERENCE POSITION | ADJACENT PRECEDING VEHICLE TRAVEL MARGIN |
|---|---|---|
| A | LANE MARKING EDGE ON LEFT SIDE OF ADJACENT PRECEDING VEHICLE | 0.5m |
| B | BOTH EDGES OF OTHER VEHICLE | 1.8m |
| C | LANE MARKING EDGE ON LEFT SIDE OF ADJACENT PRECEDING VEHICLE | 0.75m |
| D | SOLID OBJECT EDGE ON ADJACENT PRECEDING VEHICLE SIDE | 1.5m |

FIG. 6

| LENGTH OF SIDE-BY-SIDE ZONE IN TRAVELING DIRECTION | ≤ 20m | ≤ 40m | ≤ 80m | ≥ 80m |
|---|---|---|---|---|
| LENGTH OF SIDE-BY-SIDE ZONE IN LATERAL DIRECTION | 2.5m | 2.75m | 3.0m | 3.5m |

FIG. 7

| SITUATION TYPE | REFERENCE POSITION | ADJACENT PRECEDING VEHICLE TRAVEL MARGIN | | |
|---|---|---|---|---|
| | | VELOCITY OF ADJACENT PRECEDING VEHICLE ≤ 10km/h | VELOCITY OF ADJACENT PRECEDING VEHICLE ≤ 25km/h | VELOCITY OF ADJACENT PRECEDING VEHICLE ≥ 25km/h |
| A | LANE MARKING EDGE ON LEFT SIDE OF ADJACENT PRECEDING VEHICLE | + 0m | + 0.05m | + 0.1m |
| B | BOTH EDGES OF OTHER VEHICLE | + 0m | + 0.1m | + 0.2m |
| C | LANE MARKING EDGE ON LEFT SIDE OF ADJACENT PRECEDING VEHICLE | + 0m | + 0.05m | + 0.1m |
| D | SOLID OBJECT EDGE ON ADJACENT PRECEDING VEHICLE SIDE | + 0m | + 0.1m | + 0.2m |

FIG. 9

| SITUATION TYPE | INFLECTION POINT POSITION [m] |
|---|---|
| A | x |
| B | x − 3 |
| C | x − 1 |
| D | x − 3 |

VEHICLE CONTROL DEVICE AND CONTROL METHOD FOR VEHICLE

INCORPORATION BY REFERENCE

The disclosure of Japanese Patent Application No. 2018-005924 filed on Jan. 17, 2018 including the specification, drawings and abstract is incorporated herein by reference in its entirety.

BACKGROUND

1. Technical Field

The present disclosure relates to a vehicle control device and a control method for a vehicle.

2. Description of Related Art

Japanese Unexamined Patent Application Publication No. 2001-048036 (JP 2001-048036 A) discloses a lane keeping assist system for causing a host vehicle not to departure from a set target travel trajectory in which the target travel trajectory is corrected, based on detected off-lane obstacles which exist outside a lane of the host vehicle (host lane), by being shifted in a direction away from the off-lane obstacles when the host vehicle passes the off-lane obstacles. For example, when the host vehicle passes an adjacent preceding vehicle that is traveling in an adjacent lane, the target travel trajectory draws a slightly curved path by the correction so as to move away from the adjacent preceding vehicle.

SUMMARY

In JP 2001-048036 A, when a target such as another vehicle or solid object is present within a zone further adjacent to the adjacent preceding vehicle that is traveling in a lane adjacent to the host lane, the adjacent preceding vehicle may travel closer to the host lane side to avoid the target. In such a case, the lane keeping assist system of the host vehicle detects that the adjacent preceding vehicle draws a curved path and corrects the target travel trajectory of the host vehicle; however, the target travel trajectory of the host vehicle cannot be corrected until the adjacent preceding vehicle travels along a curved path. Consequently, occupants of the host vehicle may recognize that the target travel trajectory correction is delayed and feel uncomfortable.

The present disclosure provides a vehicle control device and a control method for a vehicle which are capable of correcting a target travel trajectory of a host vehicle with respect to off-lane obstacles at a timing earlier than that of the related art.

A first aspect of the present disclosure relates to a vehicle control device. The vehicle control device includes an external sensor configured to acquire environmental information around a host vehicle, and an electronic control unit. The electronic control unit is configured to control the host vehicle so that the host vehicle travels along a target travel trajectory; detect an adjacent preceding vehicle that is traveling in a lane adjacent to a lane in which the host vehicle is traveling, based on detected information of the external sensor; acquire environmental information on a road side or a lane on an opposite side of the lane in which the adjacent preceding vehicle is traveling from the lane in which the host vehicle is traveling, based on the detected information of the external sensor; and generate the target travel trajectory of the host vehicle so as to move away from the adjacent preceding vehicle in a width direction of the lane in which the host vehicle is traveling, within a lane width of the lane in which the host vehicle is traveling, based on the environmental information.

In the vehicle control device according to the first aspect of the present disclosure, the electronic control unit may be configured to acquire a center trajectory along a center in the width direction of the lane in which the host vehicle is traveling. The electronic control unit may be configured to generate the target travel trajectory of the host vehicle by correcting the center trajectory based on the environmental information.

In the vehicle control device according to the first aspect of the present disclosure, the electronic control unit may be configured to predict a lateral position of the adjacent preceding vehicle when the adjacent preceding vehicle passes the host vehicle based on the environmental information. The electronic control unit may be configured to generate the target travel trajectory of the host vehicle based on the predicted lateral position of the adjacent preceding vehicle.

In the vehicle control device according to the aspect of the present disclosure, the electronic control unit may be configured to determine a type of the environmental information. The electronic control unit may be configured to predict the lateral position based on the type.

In the vehicle control device according to the aspect of the present disclosure, the electronic control unit may be configured to: in a case where a width interval between the predicted lateral position of the adjacent preceding vehicle and the target travel trajectory is equal to or less than a predetermined value, determine that the target travel trajectory needs to be corrected; and correct the target travel trajectory in a direction away from the adjacent preceding vehicle in the width direction of the lane in which the host vehicle is traveling.

In the vehicle control device according to the aspect of the present disclosure, the electronic control unit may be configured to correct the target travel trajectory so that an inflection point of the target travel trajectory is at a position closer to a current position of the host vehicle than a reference position, in a case where a width interval between the predicted lateral position of the adjacent preceding vehicle and the target travel trajectory is equal to or less than a predetermined value.

A second aspect of the present disclosure relates to a control method for a vehicle including an external sensor and an electronic control unit. The method includes controlling, by the electronic control unit, a host vehicle so that the host vehicle travels along a target travel trajectory; detecting, by the electronic control unit, an adjacent preceding vehicle that is traveling in a lane adjacent to a lane in which the host vehicle is traveling, based on detected information of the external sensor; acquiring, by the electronic control unit, environmental information on a road side or a lane on an opposite side of the lane in which the adjacent preceding vehicle is traveling from the lane in which the host vehicle is traveling, based on the detected information of the external sensor; and generating, by the electronic control unit, the target travel trajectory of the host vehicle so as to move away from the adjacent preceding vehicle in a width direction of the lane in which the host vehicle is traveling, within a lane width of the lane in which the host vehicle is traveling, based on the environmental information.

According to the aspects of the present disclosure, it is possible to correct the target travel trajectory of the host vehicle before the adjacent preceding vehicle travels along a curved path, thereby suppressing the uncomfortable feeling of the occupants.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 4 is a table illustrating examples of the reference position and the predicted adjacent preceding vehicle lateral position, respectively corresponding to each of the situation types, according to the first embodiment of the present disclosure;

FIG. 6 is a table illustrating exemplary correlations between a length in a traveling direction of a side-by-side zone and a corresponding width of the side-by-side zone, according to a second embodiment of the present disclosure;

FIG. 7 is a table illustrating exemplary correlations among the situation type, velocity of the adjacent preceding vehicle, and an adjacent preceding vehicle travel margin, according to a third embodiment of the present disclosure;

FIG. 9 is a table illustrating an exemplary correlation between each of the situation types and the inflection point position according to the fourth embodiment of the present disclosure.

DETAILED DESCRIPTION OF EMBODIMENTS

Figure 1:
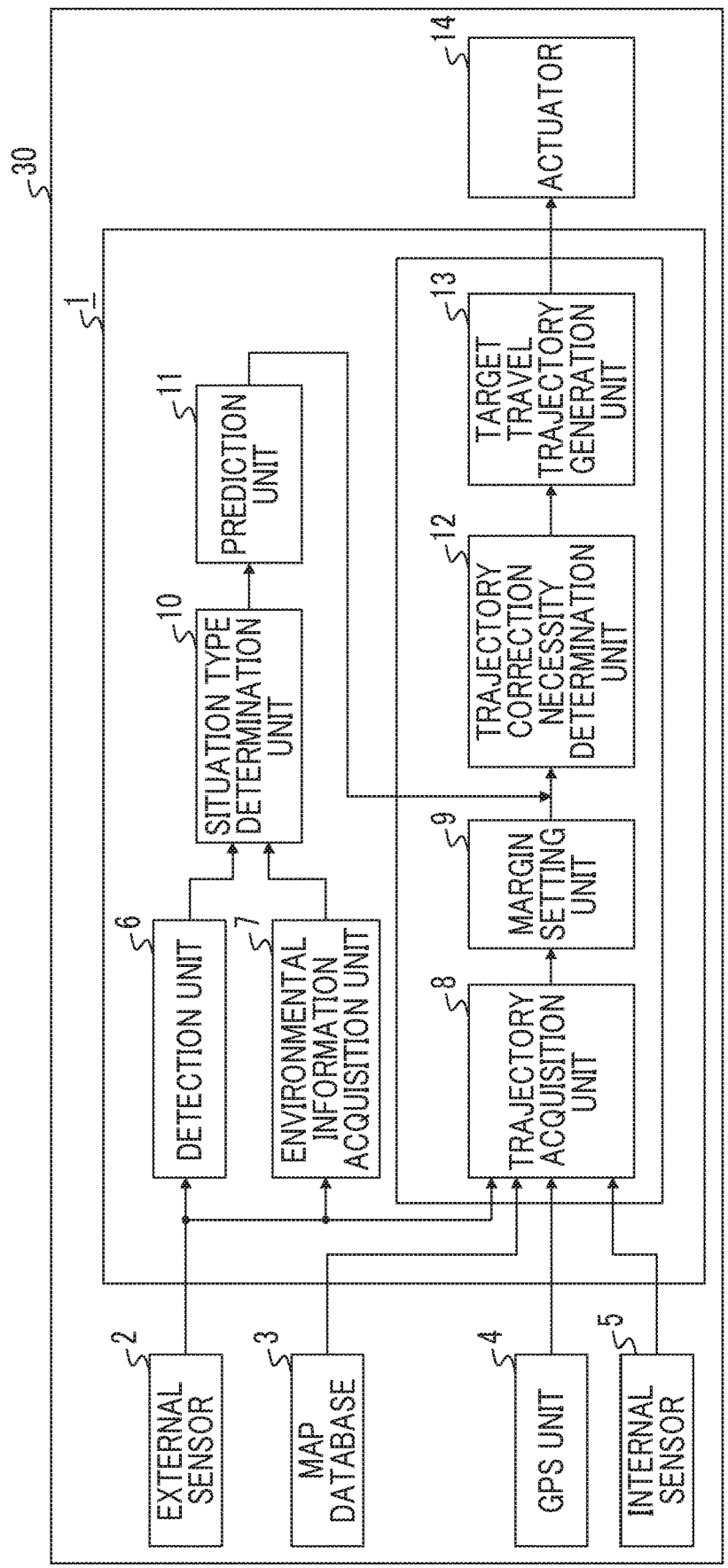
FIG. 1 is a block diagram illustrating a configuration of a first embodiment of the present disclosure.

Embodiments of the present disclosure will be described below with reference to the drawings. In the following description, the same or equivalent elements will be denoted by the same reference numerals, and repetitive descriptions will be omitted.

First Embodiment

Constable Host Vehicle Margin & Variable Side-by-side Vehicle Margin

FIG. 1 is a block diagram illustrating a configuration of a host vehicle 30 in which a vehicle control device 1 of a first embodiment of the present disclosure is installed. The host vehicle 30 is provided with, as shown in FIG. 1, the vehicle control device 1, an external sensor 2 connected to the vehicle control device 1, a map database 3, a GPS unit 4, an internal sensor 5, and an actuator 14. The vehicle control device 1 is provided with a detection unit 6, an environmental information acquisition unit 7, a trajectory acquisition unit 8, a margin setting unit 9, a situation type determination unit 10, a prediction unit 11, a trajectory correction necessity determination unit 12, and a target travel trajectory generation unit 13, as a functional configuration.

Figure 2:
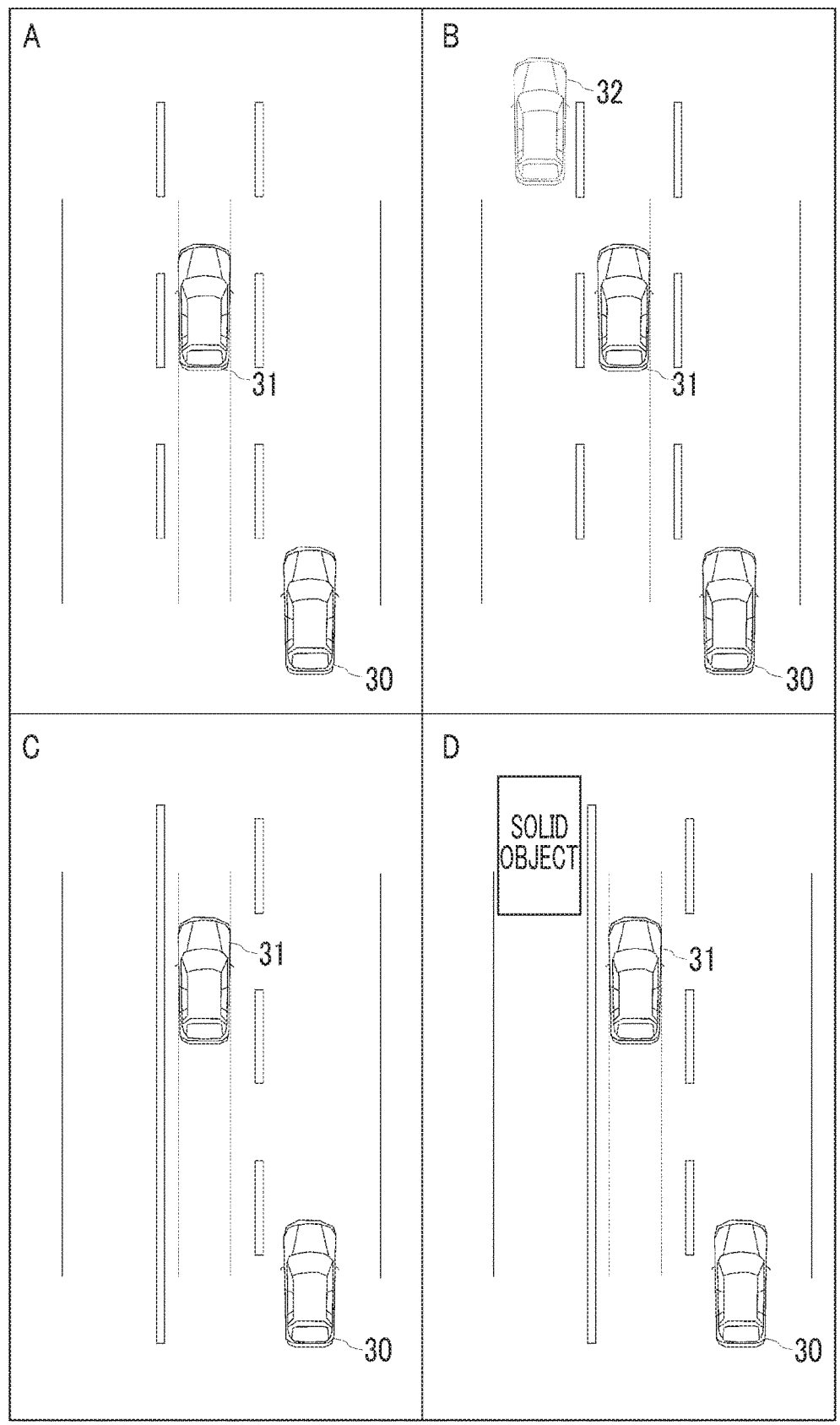
FIG. 2 is a bird's-eye view illustrating situation types including a host vehicle, an adjacent preceding vehicle, and environmental information according to the first embodiment of the present disclosure.

FIG. 2 shows a bird's-eye view illustrating four situation types including the host vehicle 30, an adjacent preceding vehicle 31 which travels in an adjacent lane, and surrounding environment which includes surrounding white lines, road boundaries, solid objects, other vehicles and the like. Hereinafter, the configuration of the vehicle control device 1 according to the first embodiment will be described with reference to the host vehicle 30 and the adjacent preceding vehicle 31, shown in FIG. 2, as the examples. The four situation types shown in FIG. 2 will be described later in more detail. The lane is a zone defined by white lines, lane markings, solid objects and the like, in which a vehicle can travel.

The vehicle control device 1 is an electronic control unit (ECU) which has a central processing unit (CPU), a read only memory (ROM), a random access memory (RAM), a controller area network (CAN) communication circuit and the like.

The external sensor 2 is a sensor for detecting surrounding environment of the host vehicle 30 and the adjacent preceding vehicle 31. The surrounding environment is defined as information on positions, shapes, velocity and the like, of road structures including white lines, road surface markings, guard rails, poles and the like; dynamic targets including other vehicles, pedestrians and the like; and static targets including buildings, signs and the like, which exist around the host vehicle 30 and the adjacent preceding vehicle 31. The external sensor 2 is, for example, a camera, a millimeter-wave radar, a LIDAR (laser imaging detection and ranging) or the like, which transmits the detected information to the vehicle control device 1. Various sensors installed in the adjacent preceding vehicle 31 or the road facility side may be used as long as they are communicably connected to the vehicle control device 1, as the external sensor 2, in addition to various sensors installed in the host vehicle 30. A sensor which is not installed in the host vehicle 30 is communicably connected to the vehicle control device 1 using vehicle-to-vehicle (V2V) communication in a case of a sensor installed in the adjacent preceding vehicle 31, or using vehicle-to-everything (V2X) communication in a case of a sensor installed in the road facility side.

The map database 3 is a database for storing maps including road network information, road shape information, lane information, static obstacle information and the like, which is stored in a storage medium so as to be accessible from the vehicle control device 1. For example, the map database 3 is stored in a storage medium such as a hard disk drive (HDD), a solid state drive (SSD) or the like. The map database 3, of which storage location is not particularly limited as long as it is accessible from the vehicle control device 1, may be installed in the host vehicle 30, or may be stored in an external server that is not installed in the host vehicle 30. In a case of using the external server, the vehicle control device 1 may access the external server using V2X communication, or a mobile terminal communication network such as LTE (long term evolution) or the like.

The GPS unit 4 can acquire current position information of the host vehicle 30 based on radio waves received from global positioning system (GPS) satellites.

The internal sensor 5 is installed in the host vehicle 30 and acquires information relating to the current travel status of the host vehicle 30. The internal sensor 5 is, for example, a wheel speed sensor, an acceleration sensor, a yaw rate sensor, a compass or the like.

Next, the functional configuration of the vehicle control device 1 will be described. The detection unit 6 detects the adjacent preceding vehicle 31 that is traveling in a lane adjacent to a lane in which the host vehicle 30 is traveling, based on a signal received from the external sensor 2, thereby acquiring information on the position, shape, size, vehicle width and the like, of the adjacent preceding vehicle 31.

The environmental information acquisition unit 7 acquires environmental information within the side-by-side zone of the adjacent preceding vehicle 31 detected by the detection unit 6. The side-by-side zone means a zone, which has a predetermined length and a predetermined width on the right or left opposite side of the adjacent preceding vehicle 31 from the host vehicle 30, and is adjacent to a lane in which the adjacent preceding vehicle 31 is traveling. The environmental information acquisition unit 7 acquires information on positions, shapes, velocity and the like, of road structures including white lines, road surface markings, guard rails, poles and the like; dynamic targets including other vehicles, pedestrians and the like; and static targets including buildings, signs and the like, which exist within the side-by-side zone of the adjacent preceding vehicle 31, based on the information acquired by the external sensor 2. Moreover, the environmental information acquisition unit 7 may refer to the map database 3 based on the current position of the host vehicle 30, acquired by the GPS unit 4, and may acquire environmental information within the side-by-side zone of the adjacent preceding vehicle 31 from the map information. Additionally, the environmental information acquisition unit 7 may acquire environmental information of the entire acquirable range, not limited to the side-by-side zone.

The trajectory acquisition unit 8 acquires a target travel trajectory of the host vehicle 30. In the example, the target travel trajectory of the host vehicle 30, including a time at which the host vehicle 30 and the adjacent preceding vehicle 31 are expected to pass each other, is generated based on information on the targets around the host vehicle 30 based on the signal received from the external sensor 2; current travel status of the host vehicle 30 based on a signal received from the internal sensor 5; a road shape of the road in which the host vehicle 30 is traveling, which is acquired based on signals received from the GPS unit 4 and the map database 3; and the like. Moreover, the target travel trajectory of the host vehicle 30 may be acquired by predicting a travel trajectory of the host vehicle 30 based on the signal received from the internal sensor 5, or based on a steering operation or a pedal operation by a driver. Furthermore, a trajectory along a center of the lane in which the host vehicle 30 is traveling may be acquired as the target travel trajectory of the host vehicle 30, based on the map information and the current position of the host vehicle 30, under the assumption that the host vehicle 30 travels along a road.

The margin setting unit 9 sets a host vehicle travel margin used for determination of the trajectory correction necessity determination unit 12, which will be described later. The margin setting unit 9 acquires a lateral position of the host vehicle 30 when the host vehicle 30 passes by the adjacent preceding vehicle 31 from the travel trajectory of the host vehicle 30, acquired by the trajectory acquisition unit 8, thereby setting as the host vehicle travel margin a value of the predicted lateral distance between the host vehicle 30 and the adjacent preceding vehicle 31 in a case where it is assumed that the adjacent preceding vehicle 31 keeps a travel trajectory at the present moment. The host vehicle travel margin may be a predetermined constant value.

The situation type determination unit 10 determines a type of a situation, including the host vehicle 30, the adjacent preceding vehicle 31 that is traveling in the adjacent lane, and the environmental information on the side-by-side zone, based on signals received from the detection unit 6 and the environmental information acquisition unit 7. In this embodiment, the situation type determination unit 10 determines a current situation by classifying the situation into four types shown in FIG. 2. Hereinafter, the respective situation types shown in FIG. 2 will be described below.

Situation Type A

First, a situation type A shown at the upper left of FIG. 2 illustrates that the adjacent preceding vehicle 31 travels ahead of the host vehicle 30 in a lane adjacent to a left side of the lane in which the host vehicle 30 is traveling. In the situation type A, there is a lane adjacent to the adjacent preceding vehicle 31 at a position further away from the host vehicle 30 (a left lane of the adjacent preceding vehicle 31). No other vehicle is present within a side-by-side zone on a left side of the adjacent preceding vehicle 31.

Situation Type B

A situation type B shown at the upper right of FIG. 2 illustrates that the adjacent preceding vehicle 31 travels ahead of the host vehicle 30 in the lane adjacent to the left side of the lane in which the host vehicle 30 is traveling, and there is the left lane of the adjacent preceding vehicle 31, similarly to the situation type A described above. However, in the situation type B, the other vehicle 32 is present within a side-by-side zone in the left lane of the adjacent preceding vehicle 31.

Situation Type C

A situation type C shown at the lower left of FIG. 2 illustrates that the adjacent preceding vehicle 31 travels ahead of the host vehicle 30 in the lane adjacent to the left side of the lane in which the host vehicle 30 is traveling, similarly to the situation type A described above. However, in the situation type C, a non-roadway is disposed on the left side of the adjacent preceding vehicle 31. Moreover, no solid object such as a building, a pedestrian or the like is present within a side-by-side zone on the left side of the adjacent preceding vehicle 31, which is the non-roadway.

Situation Type D

A situation type D shown at the lower right of FIG. 2 illustrates that the adjacent preceding vehicle 31 travels ahead of the host vehicle 30 in a lane adjacent to a left side of the lane in which the host vehicle 30 is traveling, and there is the non-roadway on the left side of the adjacent preceding vehicle 31, similarly to the situation type C described above. However, the solid object, such as a building, a pedestrian or the like, is present within a side-by-side zone which is the non-roadway on the left side of the adjacent preceding vehicle 31.

For each of the situation types described above, the adjacent preceding vehicle 31 may travel along a trajectory which is curved in a direction in which the host vehicle 30 is traveling. A degree of the curved trajectory may be varied in accordance with the situation type. The vehicle control device 1 according to the embodiment corrects the target travel trajectory in a direction away from the adjacent preceding vehicle 31 so that the host vehicle 30 does not come too close to the adjacent preceding vehicle 31. Hereinafter, a configuration for properly correcting a trajectory in accordance with the situation type will be described.

The prediction unit 11 predicts a lateral position (a predicted adjacent preceding vehicle lateral position) of the adjacent preceding vehicle 31 when the adjacent preceding vehicle 31 passes the host vehicle 30 based on the determination result of the situation type determination unit 10. The prediction unit 11 can predict the predicted adjacent preceding vehicle lateral position based on a reference position corresponding to each situation type, an adjacent preceding vehicle travel margin, and a vehicle width of the adjacent preceding vehicle 31, as described below. Accordingly, a distance from a left edge of the host vehicle travel trajectory predicted by the trajectory acquisition unit 8 to the predicted adjacent preceding vehicle lateral position can be obtained. The distance from the left edge of the host vehicle travel trajectory to the predicted adjacent preceding vehicle lateral position is an interval in a lateral direction, which is predicted when the adjacent preceding vehicle 31 and the host vehicle 30 pass each other.

Figure 3:
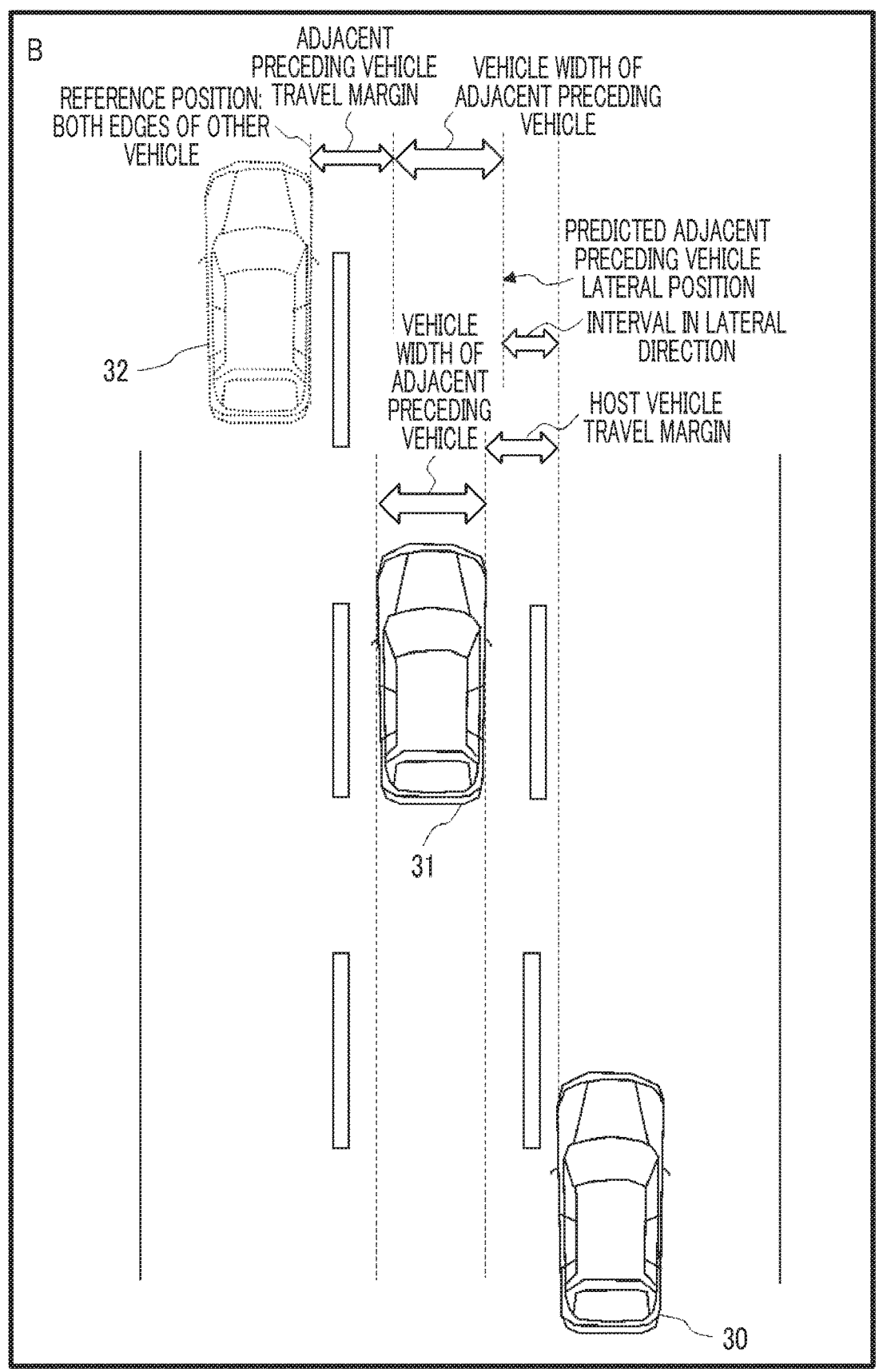
FIG. 3 is a bird's-eye view illustrating a correlation among both edges of another vehicle as a reference position, an adjacent preceding vehicle travel margin, a vehicle width of the adjacent preceding vehicle, a predicted adjacent preceding vehicle lateral position, and a host vehicle travel margin, in the situation type B according to the first embodiment of the present disclosure.

Referring to FIG. 3 and FIG. 4, one example showing how to determine the predicted adjacent preceding vehicle lateral position according to the situation type will be described. FIG. 3 is a bird's-eye view illustrating a correlation among the reference position, the adjacent preceding vehicle travel margin, the vehicle width of the adjacent preceding vehicle 31, the predicted adjacent preceding vehicle lateral position, and the host vehicle travel margin, in the situation type B shown in FIG. 2.

In the example shown in FIG. 3, the predicted adjacent preceding vehicle lateral position is obtained, with a position of a right edge of the other vehicle 32 that is traveling in a lane adjacent to the adjacent preceding vehicle 31 as the reference position, by adding the adjacent preceding vehicle travel margin at a predetermined distance from the reference position and the vehicle width of the adjacent preceding vehicle 31 to a lateral side of the road. The reference position and the adjacent preceding vehicle travel margin are determined in advance for each situation type, as shown in FIG. 4.

FIG. 4 is a table illustrating examples of the reference position and the predicted adjacent preceding vehicle lateral position, respectively corresponding to each of the situation types. In the situation type other than the situation type B described in FIG. 3, the predicted adjacent preceding vehicle lateral position is calculated as a position obtained by adding the adjacent preceding vehicle travel margin at a predetermined distance from the reference position and the vehicle width of the adjacent preceding vehicle 31 to a right direction of the road.

(Situation Type A) In the situation type A, the reference position is a lane marking edge on the left side of the adjacent preceding vehicle 31, and the adjacent preceding vehicle travel margin is 0.5 m.

(Situation Type B) In the situation type B, the reference position is both edges of the other vehicle, that is, a right edge of the other vehicle 32. The adjacent preceding vehicle travel margin is 1.8 m.

(Situation Type C) In the situation type C, the reference position is a lane marking edge on the left side of the adjacent preceding vehicle 31, and the adjacent preceding vehicle travel margin is 0.75 m.

(Situation Type D) In the situation type D, the reference position is a solid object edge on the adjacent preceding vehicle side, that is, a right edge of the solid object on the left side of the adjacent preceding vehicle 31. The adjacent preceding vehicle travel margin is 1.5 m.

Hereinafter, the functional configuration of the vehicle control device 1 related to the control in accordance with the situation type will be described.

The trajectory correction necessity determination unit 12 determines whether or not the target travel trajectory of the host vehicle 30 needs to be corrected, based on the target travel trajectory of the host vehicle, acquired by the trajectory acquisition unit 8, the host vehicle travel margin set by the margin setting unit 9, and the predicted adjacent preceding vehicle lateral position predicted by the prediction unit 11. In a case where the interval in the lateral direction, between the host vehicle travel trajectory and the predicted adjacent preceding vehicle lateral position, is less than the host vehicle travel margin, the trajectory correction necessity determination unit 12 determines that the correction is needed for correcting the travel trajectory of the host vehicle 30 in a direction away from the adjacent preceding vehicle 31.

The target travel trajectory generation unit 13 is capable of, in a case where the adjacent preceding vehicle 31 is present, correcting the target travel trajectory of the host vehicle 30 so as to laterally move away from the adjacent preceding vehicle 31 detected by the detection unit 6. In this case, the target travel trajectory generation unit 13 sets a target travel position next to the host vehicle 30 when the host vehicle 30 passes by the adjacent preceding vehicle 31, based on the environmental information acquired by the environmental information acquisition unit 7, and corrects the target travel trajectory of the host vehicle 30 so that the host vehicle 30 passes through such a target travel position. The target travel trajectory generation unit 13 corrects the target travel trajectory of the host vehicle 30 based on the determination result of the trajectory correction necessity determination unit 12. When the trajectory correction necessity determination unit 12 determines that the target travel trajectory of the host vehicle 30 needs to be corrected, the target travel trajectory generation unit 13 corrects the current target travel trajectory to a trajectory drawing a curved path in a direction away from the adjacent preceding vehicle 31. The path curve width of the corrected trajectory, i.e. deviation from the previous target travel trajectory, may be set based on a predetermined constant value, or may be variably determined based on a difference between the lateral interval and the host vehicle travel margin, provided that the target travel trajectory is determined to the extent that such a trajectory is not interfered by positions of other targets, obstacles, lane markings and the likes, based on information acquired from the external sensor 2, the GPS unit 4, and the map database 3.

The actuator 14 is a device which performs steering based on a signal transmitted from the vehicle control device 1, and an electric power steering (EPS) device is used as the actuator 14. The actuator 14 includes a driving device for steering and a device for measuring a steering angle, and the steering angle is controlled by a feedback control so as to draw the target travel trajectory obtained by the vehicle control device 1.

Flowchart

Figure 5:
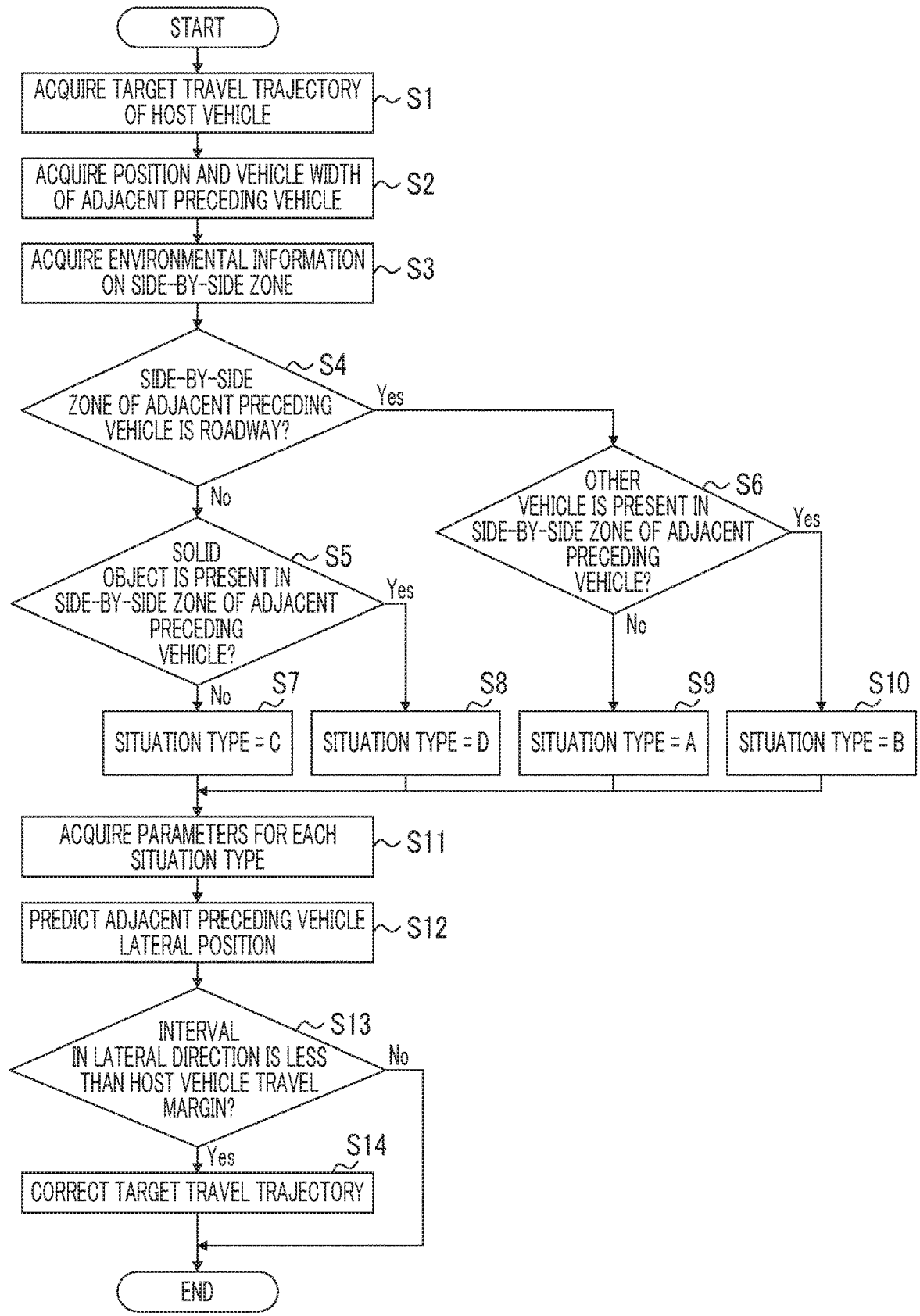
FIG. 5 is a flowchart showing a series of processes relating to target travel trajectory correction of the host vehicle, which is executed by a vehicle control device according to the first embodiment of the present disclosure.

Next, a series of processes relating to the trajectory correction of the host vehicle 30, executed by the vehicle control device 1, will be described with reference to a flowchart shown in FIG. 5. In step S1, the trajectory acquisition unit 8 acquires the target travel trajectory of the host vehicle 30.

Subsequently, in step S2, the detection unit 6 detects the adjacent preceding vehicle 31. In step S2, a position and a vehicle width of the adjacent preceding vehicle 31 are acquired.

Subsequently, in step S3, the environmental information acquisition unit 7 acquires the environmental information relating to the surrounding environment within the side-by-side zone set on the left side of the adjacent preceding vehicle 31.

Subsequently, in step S4, the situation type determination unit 10 determines whether or not the side-by-side zone of the adjacent preceding vehicle 31 is a roadway based on the environmental information acquired by the environmental information acquisition unit 7. When the situation type determination unit 10 determines that it is not a roadway (step S4: NO), the process proceeds to step S5. Whereas, when the situation type determination unit 10 determines that it is a roadway (step S4: YES), the process proceeds to step S6.

In step S5, the situation type determination unit 10 determines whether or not a solid object is present within the side-by-side zone of the adjacent preceding vehicle 31. When the situation type determination unit 10 determines that a solid object is not present within the side-by-side zone of the adjacent preceding vehicle 31 (step S5: NO), the process proceeds to step S7 and the situation type is defined as C (step S7). Whereas, in step S5, the situation type determination unit 10 determines that a solid object is present within the side-by-side zone of the adjacent preceding vehicle 31 (step S5: YES), the process proceeds to step S8 and the situation type is defined as D (step S8).

In step S6, the situation type determination unit 10 determines whether or not a vehicle adjacent to the adjacent preceding vehicle 31 (hereinafter referred to as "other vehicle 32") within the side-by-side zone of the adjacent preceding vehicle 31. When the situation type determination unit 10 determines that the other vehicle 32 is not present within the side-by-side zone of the adjacent preceding vehicle 31 (step S6: NO), the process proceeds to step S9 and the situation type is defined as A (step S9). Whereas, in step S6, the situation type determination unit 10 determines that the other vehicle 32 is present within the side-by-side zone of the adjacent preceding vehicle 31 (step S6: YES), the process proceeds to step S10 and the situation type is defined as B (step S10).

The situation type is determined in any of steps S6 to S10, and then the process proceeds to step S11. In step S11, after the situation type determination unit 10 determines the situation type in any of steps S6 to S10, the prediction unit 11 acquires the adjacent preceding vehicle travel margin and the reference position as parameters in accordance with the situation type. The process proceeds to step S12.

In step S12, the prediction unit 11 predicts the lateral position of the adjacent preceding vehicle 31 based on the adjacent preceding vehicle travel margin and the reference position, which are reflected in step S11, and the vehicle width of the adjacent preceding vehicle 31, which is detected in step S2. The process proceeds to step S13.

In step S13, the trajectory correction necessity determination unit 12 determines whether or not the interval in the lateral direction, between the target travel trajectory acquired in step S1 and the predicted adjacent preceding vehicle lateral position obtained by step S12, is less than the host vehicle travel margin. When the trajectory correction necessity determination unit 12 determines that the interval in the lateral direction is less than the host vehicle travel margin (step S13: YES), the process proceeds to step S14.

Whereas, the trajectory correction necessity determination unit 12 determines that the interval in the lateral direction is not less than the host vehicle travel margin (step S13: NO), the vehicle control device 1 ends a series of the processes.

In step S14, the target travel trajectory generation unit 13 corrects the target travel trajectory of the host vehicle 30, and the vehicle control device 1 ends a series of the processes.

The first embodiment is described above, however, an applicable embodiment of the present disclosure is not limited to this embodiment. In the description of the first embodiment stated above, the positions of the host vehicle 30, the adjacent preceding vehicle 31, the other vehicle 32, the solid object and the like may be mirrored. Furthermore, the value of the adjacent preceding vehicle travel margin may be a value other than the value exemplified in the first embodiment.

According to the first embodiment, it is possible to correct the target travel trajectory of the host vehicle before a behavior of the adjacent preceding vehicle changes with respect to the environmental information, by correcting the target travel trajectory of the host vehicle based on the environmental information of the side-by-side zone of the adjacent preceding vehicle that is traveling in a lane adjacent to a lane in which the host vehicle is traveling. Furthermore, it is possible to predict the position of the adjacent preceding vehicle 31, which varies in accordance with the situation type, determine accurately whether or not the correction is needed, and obtain an appropriate correction amount for allowing the host vehicle 30 to move away from the adjacent preceding vehicle 31. Consequently, the uncomfortable feeling of the passengers can be suppressed.

In the example described above, the lateral position of the adjacent preceding vehicle 31 is predicted by referring to the reference position and the adjacent preceding vehicle travel margin corresponding to each of the four situation types. However, the situation types are not limited to four as long as the number of types is two or more. The predicted adjacent preceding vehicle lateral position may be calculated using the detection result of the external sensor 2 and the conventional object trajectory prediction method, without using a database of situation types prepared in advance.

In the example described above, the trajectory correction necessity determination unit 12 determines whether or not the correction is needed based on the lateral position of the adjacent preceding vehicle 31, predicted by the situation type determination unit 10 and the prediction unit 11, and the target travel trajectory of the host vehicle 30 is corrected when the trajectory correction necessity determination unit 12 determines that the correction is needed. However, the target travel trajectory may be corrected without prediction of the lateral position of the adjacent preceding vehicle 31 and correction necessity determination based on the lateral position prediction. For example, a configuration may be allowed in which the target travel trajectory of the host vehicle 30 is corrected so as to move away from the adjacent preceding vehicle 31 when the target is detected within the side-by-side zone of the adjacent preceding vehicle 31. Provided that, also in this case, the target travel trajectory is corrected to the extent that such a trajectory is not interfered by positions of other targets, obstacles, lane markings and the likes, based on information acquired from the external sensor 2, the GPS unit 4, and the map database 3.

In the example described above, the trajectory along the center of the lane acquired by the trajectory acquisition unit 8, is corrected; however, the target travel trajectory generation unit 13 may directly generate the trajectory based on the environmental information.

Second Embodiment

Variable Side-by-Side Zone

Next, a second embodiment will be described. Hereinafter, distinct features from the first embodiment will be described and repetitive descriptions will be omitted. A difference between the first embodiment and the second embodiment is that, in the second embodiment, the environmental information acquisition unit 7 variably sets a side-by-side zone. The following descriptions explain how to variably set a side-by-side zone by the environmental information acquisition unit 7.

The environmental information acquisition unit 7 of the second embodiment sets a length of the side-by-side zone in the traveling direction based on the velocity of the adjacent preceding vehicle 31. In the second embodiment, the length of the side-by-side zone in the traveling direction is set by multiplying the velocity of the adjacent preceding vehicle 31 by a specified number of seconds. That is, the length of the side-by-side zone in the traveling direction is a distance that the adjacent preceding vehicle travels for the specified number of seconds when maintaining the current velocity. The specified number of seconds can be randomly determined. For example, an exemplified specified number of seconds is defined as 3 to 6 seconds.

Moreover, the environmental information acquisition unit 7 may set the length of the side-by-side zone in the traveling direction by multiplying a relative velocity between the adjacent preceding vehicle 31 and the host vehicle 30 by a specified number of seconds.

In addition, the environmental information acquisition unit 7 variably determines a length (width) of the side-by-side zone in the lateral direction in accordance with the length of the side-by-side zone in the traveling direction. FIG. 6 shows exemplary correlations between the length in the traveling direction of the side-by-side zone and a corresponding width of the side-by-side zone. In this example, as the length of the side-by-side zone increases, the width also increases. Moreover, the length of the side-by-side zone may be solely variable, and the width may be set to be constant.

Third Embodiment

Variable Adjacent Preceding Vehicle Travel Margin

Next, a third embodiment will be described. Hereinafter, distinct features from the first embodiment will be described and repetitive descriptions will be omitted. A difference between the first embodiment and the third embodiment is that, in the third embodiment, the prediction unit 11 obtains the predicted adjacent preceding vehicle lateral position based on a variable adjacent preceding vehicle travel margin. The following descriptions explain how to obtain the variable adjacent preceding vehicle travel margin used in the prediction unit 11.

FIG. 7 is a table illustrating correlations among the situation type shown in FIG. 2, the velocity of the adjacent preceding vehicle 31, which is an adjacent preceding vehicle, and the adjacent preceding vehicle travel margin. As shown in FIG. 7, the adjacent preceding vehicle travel margin proportionally increases as the velocity of the adjacent preceding vehicle increases. A correlation between the situation type and a size of the adjacent preceding vehicle travel margin may be the same as in FIG. 4. As shown in FIG. 7, the prediction unit 11 obtains the adjacent preceding vehicle travel margin, based on the correspondence shown in FIG. 7, which is defined based on the velocity of the adjacent preceding vehicle 31, which is an adjacent preceding vehicle, and the situation type determination result determined by the situation type determination unit 10. The prediction unit 11 predicts the predicted adjacent preceding vehicle lateral position based on the adjacent preceding vehicle travel margin as described above.

In the example shown in FIG. 7, the adjacent preceding vehicle travel margin varies based on the velocity of the adjacent preceding vehicle and the situation type. However, for example, when the other vehicle 32 or the solid object is present in front of the adjacent preceding vehicle 31, which is an adjacent preceding vehicle, as in a case of the situation type B or the situation type D, the adjacent preceding vehicle travel margin may vary based on the relative velocity between the adjacent preceding vehicle 31 and the other vehicle 32 or the solid object. The adjacent preceding vehicle travel margin also may vary based on a relative velocity between the adjacent preceding vehicle 31 and the host vehicle 30, a zigzag degree of the adjacent preceding vehicle 31, a vehicle type of the adjacent preceding vehicle 31 (e.g. passenger car, bus, truck, or trailer), a velocity of the host vehicle 30, a vehicle width of the host vehicle 30, or the like.

According to the third embodiment, it is possible to correct the target travel trajectory of the host vehicle with a margin for the behavior of the adjacent preceding vehicle by setting an appropriate adjacent preceding vehicle travel margin and obtaining the predicted adjacent preceding vehicle lateral position based on such an adjacent preceding vehicle travel margin, when the adjacent preceding vehicle travels fast and thus an available travel margin of the adjacent preceding vehicle is expected to be larger.

Fourth Embodiment

Variable Steering Start Timing

Next, a fourth embodiment will be described. Hereinafter, distinct features from the first embodiment will be described and repetitive descriptions will be omitted. A difference between the first embodiment and the fourth embodiment is that, in the fourth embodiment, the target travel trajectory generation unit 13 varies a steering start timing at which a traveling control starts to laterally move away from the adjacent preceding vehicle 31 by varying a position of an inflection point on the target travel trajectory of the host vehicle 30 in accordance with the situation type determined by the situation type determination unit 10. The inflection point indicates a point at which the host vehicle 30 starts to laterally move away from the adjacent preceding vehicle 31 on the target travel trajectory of the host vehicle 30. The following descriptions explain how to alter the position of the inflection point on the target travel trajectory, i.e. the steering start timing in accordance with the situation type.

Figure 8:
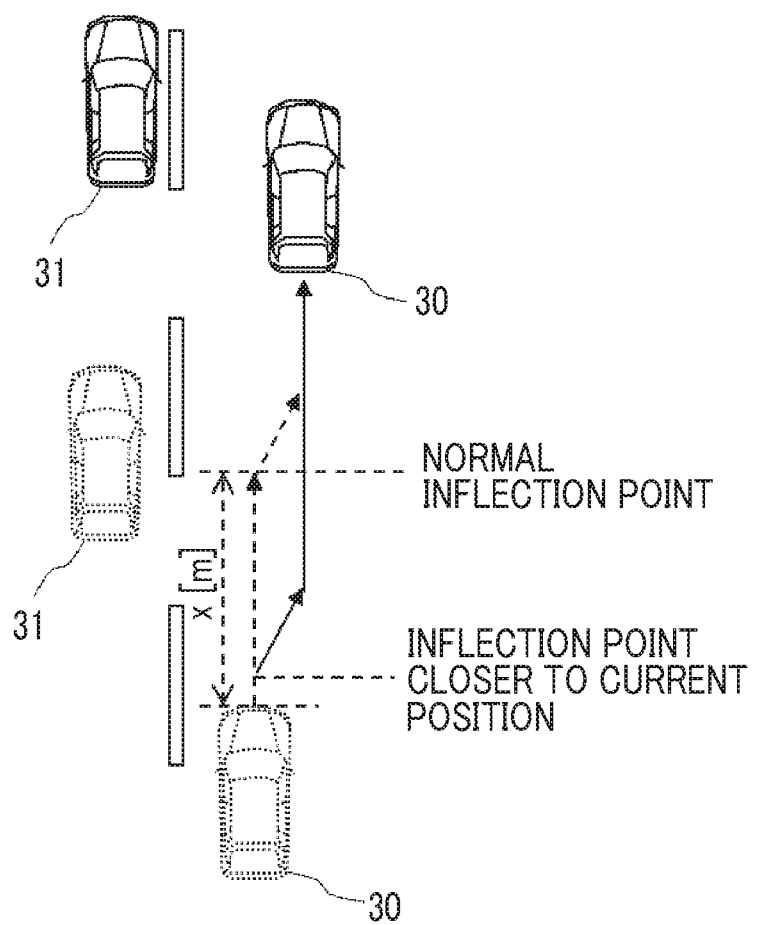
FIG. 8 is a diagram illustrating a correlation between a normal inflection point position and an inflection point position closer to a current position in a situation where the host vehicle overtakes the adjacent preceding vehicle, according to a fourth embodiment of the present disclosure.

FIG. 8 shows a correlation between the pre-correction target travel trajectory of the host vehicle 30 having the inflection point at a normal position and the post-correction target travel trajectory of the host vehicle 30 having the inflection point at a position closer to the current position in a situation where the host vehicle 30 overtakes the adjacent preceding vehicle 31. The host vehicle 30 and the adjacent preceding vehicle 31, represented by dash lines, respectively indicate the positions of the host vehicle 30 and the adjacent preceding vehicle 31 at a time when the host vehicle 30 determines whether or not the trajectory correction is needed. The host vehicle 30 and the adjacent preceding vehicle 31, represented by solid lines, respectively indicate the positions of the host vehicle 30 and the adjacent preceding vehicle 31 at a time when the host vehicle 30 overtakes the adjacent preceding vehicle 31. In this situation, the normal inflection point is a point x[m] ahead of the position of the host vehicle 30 indicated by the dash line. The inflection point in a case where the steering start timing is earlier is located ahead of the normal inflection point in the fourth embodiment. A trigger for starting the steering is not limited to a relative distance between the adjacent preceding vehicle and the host vehicle, and may be a time-to-collision (TTC). The normal inflection point (a point x[m] ahead of the current position of the host vehicle) is set to a point at which the relative distance between the host vehicle 30 and the adjacent preceding vehicle 31 or the TTC reaches a predetermined reference value.

FIG. 9 shows an exemplary correlation between each of the situation types and the inflection point position. According to the example shown in FIG. 9, in the situation type A, the target travel trajectory is set so that the steering is started at the inflection point x[m] ahead of the position of the host vehicle 30 represented by the dash line in FIG. 8. Whereas, in the situation types B, C, and D, the target travel trajectory is set so as to have the inflection point at a position in front of a point x[m] ahead of the host vehicle 30. That is, in this case, the target travel trajectory is corrected so that the inflection point on the trajectory is set in reference with a relative distance longer than a predetermined reference value of the normal inflection point position or the TTC.

According to the fourth embodiment, since the steering is started earlier in accordance with the situation type, it is possible to ensure a time margin from the steering start to the overtaking, and to reduce uneasy feeling that the occupant may feel with respect to the steering control.

The embodiments of the present disclosure have been described, however, an applicable embodiment of the present disclosure is not limited to the embodiments stated above and is implemented in various forms. The additional configurations described in the second to fourth embodiments may be implemented in any combination.

What is claimed is:

1. A vehicle control device comprising:
an external sensor configured to acquire environmental information around a host vehicle; and
an electronic control unit configured to:
control the host vehicle so that the host vehicle travels along a target travel trajectory;
detect an adjacent preceding vehicle that is traveling in a first adjacent lane which is a lane adjacent to a lane in which the host vehicle is traveling, based on detected information provided by the external sensor;
acquire environmental information on at least one of a road side and a second adjacent lane, which is another lane, different from the lane in which the host vehicle is traveling and the first adjacent lane, the second adjacent lane being disposed on an opposite side of the first adjacent lane than the lane in which the host vehicle is traveling in a width direction, and being further away from the host vehicle than the first adjacent lane; and
generate the target travel trajectory of the host vehicle so as to move the host vehicle away from the adjacent preceding vehicle in the width direction, within the lane in which the host vehicle is traveling, based on the environmental information on the at least one of the road side and the second adjacent lane,
wherein the environmental information includes information on whether there is another preceding vehicle in the second adjacent lane,
wherein the electronic control unit is further configured to determine whether the second adjacent lane has the another preceding vehicle therein,
wherein the electronic control unit is further configured to, upon a determination that the another preceding vehicle is in the second adjacent lane, generate the target travel trajectory of the host vehicle such that the target travel trajectory of the host vehicle is disposed a first distance away from the adjacent preceding vehicle in the width direction, and upon a determination that the second adjacent lane does not have the another preceding vehicle therein, generate the target travel trajectory of the host vehicle such that the target travel trajectory of the host vehicle is disposed a second distance away from the adjacent preceding vehicle in the width direction, the first distance being greater than the second distance.

2. The vehicle control device according to claim 1, wherein:
the electronic control unit is configured to acquire a center trajectory along a center in the width direction of the lane in which the host vehicle is traveling; and
the electronic control unit is configured to generate the target travel trajectory of the host vehicle by correcting the center trajectory based on the environmental information.

3. The vehicle control device according to claim 1, wherein:
the electronic control unit is configured to predict a lateral position of the adjacent preceding vehicle when the adjacent preceding vehicle passes the host vehicle based on the environmental information; and
the electronic control unit is configured to generate the target travel trajectory of the host vehicle based on the predicted lateral position of the adjacent preceding vehicle.

4. The vehicle control device according to claim 3, wherein:
the electronic control unit is configured to determine a type of the environmental information; and
the electronic control unit is configured to predict the lateral position based on the type.

5. The vehicle control device according to claim 3, wherein the electronic control unit is configured to: upon a determination that a width interval between the predicted lateral position of the adjacent preceding vehicle and the target travel trajectory is equal to or less than a predetermined value, determine that the target travel trajectory needs to be corrected; and correct the target travel trajectory in a direction away from the adjacent preceding vehicle in the width direction.

6. The vehicle control device according to claim 3, wherein the electronic control unit is configured to correct the target travel trajectory so that an inflection point of the target travel trajectory is at a position closer to a current position of the host vehicle than a reference position, upon a determination that a width interval between the predicted lateral position of the adjacent preceding vehicle and the target travel trajectory is equal to or less than a predetermined value.

7. A control method for a vehicle including an external sensor and an electronic control unit, the control method comprising:
- controlling, by the electronic control unit, a host vehicle so that the host vehicle travels along a target travel trajectory;
- detecting, by the electronic control unit, an adjacent preceding vehicle that is traveling in a first adjacent lane which is a lane adjacent to a lane in which the host vehicle is traveling, based on detected information provided by the external sensor;
- acquiring, by the electronic control unit, environmental information on at least one of a road side and a second adjacent lane, which is another lane, different from the lane in which the host vehicle is traveling and the first adjacent lane, the second adjacent lane being disposed on an opposite side of the first adjacent lane than the lane in which the host vehicle is traveling in a width direction, and being further away from the host vehicle than the first adjacent lane; and
- generating, by the electronic control unit, the target travel trajectory of the host vehicle so as to move the host vehicle away from the adjacent preceding vehicle in the width direction, within the lane in which the host vehicle is traveling, based on the environmental information, wherein the environmental information includes information on whether there is another preceding vehicle in the second adjacent lane, wherein the electronic control unit is further configured to determine whether the second adjacent lane has the another preceding vehicle therein, wherein the electronic control unit is further configured to, upon a determination that the another preceding vehicle is in the second adjacent lane, generate the target travel trajectory of the host vehicle such that the target travel trajectory of the host vehicle is disposed a first distance away from the adjacent preceding vehicle in the width direction, and upon a determination that the second adjacent lane does not have the another preceding vehicle therein, generate the target travel trajectory of the host vehicle such that the target travel trajectory of the host vehicle is disposed a second distance away from the adjacent preceding vehicle in the width direction, the first distance being greater than the second distance.

* * * * *